Figure 1:
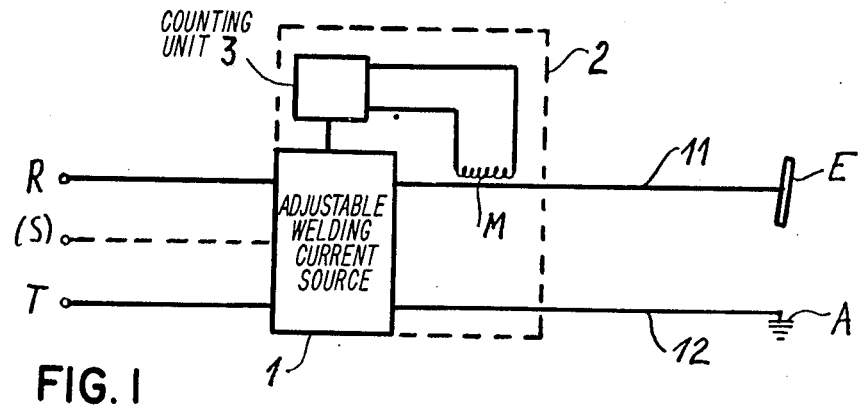

United States Patent [19]

Hansen

[11] 4,266,114
[45] May 5, 1981

[54] APPARATUS FOR THE REMOTE CONTROL OF MAINS OPERATED DC AND AC WELDING MACHINES

[75] Inventor: Kjell Hansen, Oslo, Norway

[73] Assignee: Jon Erlend Gl⌀mmen, Olso, Norway

[21] Appl. No.: 22,242

[22] Filed: Mar. 20, 1979

Related U.S. Application Data

[63] Continuation of Ser. No. 906,179, May 15, 1978, abandoned, which is a continuation of Ser. No. 723,852, Sep. 17, 1976, abandoned.

[30] Foreign Application Priority Data

Sep. 26, 1975 [NO] Norway .................................. 753286

[51] Int. Cl.³ ............................................. B23K 9/10
[52] U.S. Cl. ..................................................... 219/132
[58] Field of Search ..................... 219/132; 340/167 R, 340/168 R

[56] References Cited

U.S. PATENT DOCUMENTS

| | | | |
|---|---|---|---|
| 2,175,882 | 10/1939 | De Crocé | 219/132 |
| 2,201,868 | 5/1940 | Moffett | 219/132 |
| 2,526,597 | 10/1950 | Winslow | 219/132 |
| 3,899,773 | 8/1975 | Yamauchi et al. | 340/167 R |

Primary Examiner—C. C. Shaw
Attorney, Agent, or Firm—Ladas & Parry

[57] ABSTRACT

Apparatus for the remote control of mains operated DC and AC welding machines without any additional cable to the working place, comprising a portable regulating device adapted to be connected into the welding current circuit between the electrode or the electrode holder and the workpiece or a clamp therefor. This device selectively generates different control signals in the welding cables when receiving a current supply through the welding cables, and a regulating circuit in the welding machine is adapted to receive these control signals through the welding cables from the regulating device and to cause regulation of functions in the welding machine or in association therewith in response to the control signals. The regulating circuit comprises a decoding circuit which in response to the pulse-shaped control signals in the welding cables, is adapted to produce regulating signals for the welding machine depending upon the number of pulses or the code of pulses being provided by the regulating device, and a blocking circuit which prevents the formation of regulating signals in the decoding circuit when currents of the same order of magnitude as the welding current flow in the welding cables.

3 Claims, 3 Drawing Figures

APPARATUS FOR THE REMOTE CONTROL OF MAINS OPERATED DC AND AC WELDING MACHINES

This is a continuation, of application Ser. No. 906,179 filed May 15, 1978 now abandoned which was a continuation of Application Ser. No. 723,852 filed Sept. 17, 1976 (abandoned).

This invention generally relates to an apparatus for the remote control of the welding current and/or other parameters which it may be of interest to control in arc welding operations, this apparatus being applicable in AC welding machines (welding transformers), rectifiers as well as AC/DC welders (machines with a possibility of choice of current type), provided that the machines are designed for current regulation, possibly with continuous regulation. The regulation or control takes place without any additional cable from the welding machine to the working place, i.e. the control is performed through the welding cables.

Remote control of welding transformers without an additional cable is previously known, and as examples of prior art in this connection reference is made to Swedish Pat. No. 221,113, British Pat. No. 444,297, French Pat. No. 1,168,650 as well as Norwegian Pat. Nos. 84,513, 100,707 and 108,584. None of these solutions, however, are suitable for the regulation of rectifiers or AC/DC welders.

Remote control of welding transformers, rectifiers and AC/DC welders is previously known, i.e. from Norwegian patent application publication No. 130,930. This publication describes a system with a portable regulating device adapted to be connected into the welding current circuit between the electrode or the electrode holder and the workpiece or a clamp therefor, and serving to selectively generate different control signals in the welding cables by means of an oscillator in the regulating device, which upon the supply of current through the welding cables generates control signals in these cables in the form of oscillations or pulses, a regulating circuit in the welding machine being adapted to receive control signals through the welding cables from the regulating device and to cause regulation of functions in the welding machine or in association therewith in response to the control signals. The oscillator in the regulating device is adapted to generate control signals with selectable, specific frequencies which are higher than the mains frequency, and the regulating circuit in the welding machine comprises a sensing circuit with a frequency selector for frequency identification.

The solution according to the above Norwegian publication involves the design drawback that it is difficult to make the oscillator circuits in the regulating device and the sensing circuits in the welding machine so accurate and so similar from unit to unit that an individual adjustment of each regulating device to a specific welding machine is superfluous.

In principle the present invention is directed to the employment of pulses transmitted from the regulating device during regulation. The pulses do not have to occur at any definite frequency, but they are detected in the welding machine by a pulse counting system which may be adapted to count the number of pulses arriving or a certain combination or code of pulses.

What is novel and specific to this invention mainly consists in that the regulating circuit comprises a decoding circuit adapted, in response to pulse-shaped control signals in the welding cables generated by the regulating device, to provide regulating signals for the welding machine depending upon the number of pulses or the code of pulses transmitted by the regulating device, and a blocking circuit preventing the formation of regulating signals in the decoding circuit when currents of the same order of magnitude as the welding current flow in the welding cables.

The invention shall be explained in the following with reference to the drawing, in which:

FIG. 1 shows a block diagram of a welding machine with auxiliary equipment which is included in an apparatus according to the invention.

Figure 2:
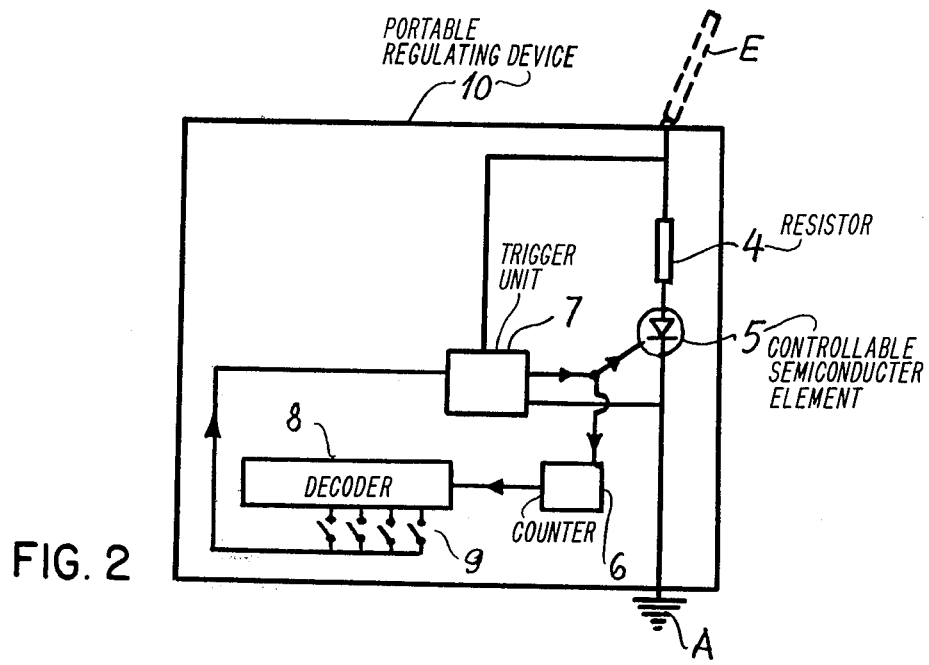
Figure 3:
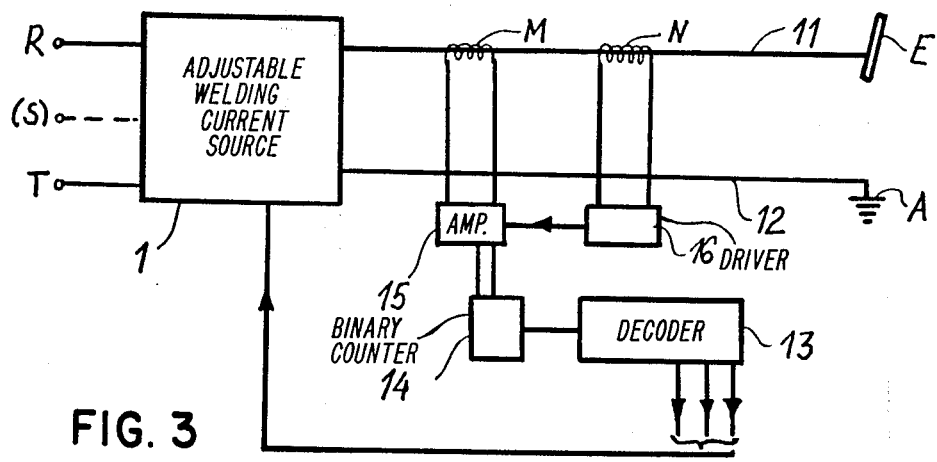

FIG. 2 schematically shows a block diagram of an embodiment of a regulating device included in the apparatus according to the invention, and FIG. 3 schematically shows a block diagram of an embodiment of a receiver portion included in the apparatus according to the invention.

In a welding machine according to the invention as shown in FIG. 1, there is included in addition to a preferably continuous, adjustable welding current source 1, a remote control arrangement with a sensing circuit comprising a field sensor M and a counting unit 3 with an information output. The sensor M may be a coil or a winding inductively coupled to one of the welding cables 11 and 12, for example the cable 11 as indicated in FIG. 1, or it may be located directly on the transformer in the welding current source.

In FIG. 1 the unit 2 consists of the welding current source 1 with its regulating circuit. The mains connection is provided by lines R and T, possibly also by line S in the case of three phase operation. The electrode holder is designated E whereas the workpiece is designated A.

In FIG. 2 there is shown an embodiment of a regulating device adapted to be connected between the electrode holder E and the workpiece A in order to provide control signals for the remote control of the welding current or other parameters, from the welding current source 1 by means of the regulating circuit included in the unit 2. The regulating device 10 has contacts for electrical connection to the electrode holder E and the workpiece A respectively, as indicated in FIG. 2. In the embodiment of the regulating device shown here, a trigger unit 7 produces pulses which trigger a controllable semiconductor element 5. For each pulse from the trigger unit 7 there will flow a current in the welding cables and the intensity of this current is limited by a resistor 4. The trigger unit 7 receives the voltage necessary for the operation thereof via the welding cables and otherwise is based upon well-known oscillator and trigger techniques, in its structure.

For each pulse from the unit 7 to the semiconductor element 5 there is also a pulse transferred to a counter 6. This counter may for example be of the type RCA CMOS CD 4518 or a combination of counters. The signals from the counter 6 are transferred as a pulse code to a multiplex decoder 8 which produces output signals depending upon the pulse code at the input thereof. As such multiplex decoder there may for example be used type RCA CMOS 4515. The decoder 8 is provided with switches across the outputs thereof.

If the operator wants to regulate a function in the welding machine, he depresses for example the button 9 on the regulating device. A circuit is then closed from that output of the decoder 8 to which the push-button 9 is connected, so that subsequent pulses are blocked, whereby the pulse corresponding to that output to which the switch 9 is connected, supplies a voltage to the trigger unit 1 so that the signal transmission is stopped. In this way the operator by means of a push-button can control accurately the number of current pulses transmitted through the welding cables.

The operator may also bring about the desired number of pulses in other ways than described above. The frequency of the transmitted pulses is quite irrelevant, and the necessary number of pulses thus can be generated for example by the operator depressing a push-button on the regulating device a certain number of times, so that there will flow a current pulse in the welding cables for each depression. Moreover, it is contemplated that the regulating device can be provided with an oscillation circuit for transmitting pulses continuously and a settable time switch adapted to interrupt the pulse transmission when the time set has elapsed. By suitable choice of times and counting codes the receiver counting circuit may be adapted to be responsive to the minimum number of pulses which may be transmitted from the regulating device within the time set.

FIG. 3 shows an embodiment of the receiver part in the apparatus according to the invention. The field sensor M generates a signal for each current pulse in the welding cable, to an amplifier system 15 and a binary counter 14 and a multiplex decoder 13. In the amplifier system 15 well-known techniques are employed, whereas for the binary counter 14 there may be used for example a circuit of the type RCA CMOS 4518 and for the multiplex decoder 13 for example type RCA CMOS 4515. In a similar way as explained with respect to the regulating device, there will appear a voltage at the one of the multiplex decoder outputs which corresponds to the detected number of pulses. This voltage may then in turn be used for initiating the regulating function which is desired by the operator.

In this respect, adjustable welding current source 1 may suitably be of the type shown and described in FIG. 1 of U.S. Pat. No. 2,175,891 issued on Oct. 10, 1939 to H. J. Graham. The current source of that patent is controlled to lower the welding current when the winding of a control relay 41 is energized, and is controlled to raise the welding current when the winding of a control relay 42 is energized. The windings of these control relays in Graham are energized by respective signals of different frequency in order to facilitate a selective capacitance-assisted coupling of the signals from the welding cables to the control relays; but in a case where the energizing signals can be directly applied to their respective control relay windings, the energizing signals obviously could be d.c. voltages of the kind appearing at the outputs of a type RCA CMOS 4515 multiplex decoder. Each control relay operates to complete a respective energizing circuit for the armature 27 of a rheostat motor 25 across the terminals of an exciter-generator 19, so that motor 25 will adjust a rheostat 24 in series with the main field winding 18 of generator 19 and thereby correspondingly adjust the welding current output of generator 19.

Self-regulation during welding is prevented by a separate winding N corresponding to the sensor M, which through a driver circuit 16 blocks the input to the amplifier 15 at the occurrence of welding cable currents of the same order of magnitude as the welding current. The winding N may possibly be involved in or may form a part of the sensor M. Another possibility consists therein that the driver unit 16 activates a relay which removes the voltage from the regulating circuit so that regulation cannot take place while welding current flows in the cable 11.

I claim:

1. Apparatus for the remote control of a mains-operated arc welding machine of the type that supplies welding current from a signal-controlled welding current source through respective cables of a welding current circuit to a welding electrode and a workpiece, said apparatus comprising:
    (a) a selectively-operable portable regulating device including a controllable semiconductor switching element connected in series with an impedance between terminals provided in said device for connecting said device across said cables, a trigger circuit connected for energization between said terminals and operable, when energized from said cables, to deliver a train of control pulses to said semiconductor switching element for opening and closing the series connection of said switching element and impedance between said terminals so as to cause current pulses to flow through said cables in synchronism with said control pulses, and settable means connected to said trigger circuit for stopping the operation thereof when the number of control pulses that flow through said cables corresponds to the setting of said settable means;
    (b) a regulating circuit in said welding machine adapted to detect the number of said current pulses flowing through said cables and to supply to said welding current source a control signal dependent upon the detected pulse number; and
    (c) a blocking circuit in said welding machine for preventing the formation of said control signal by said regulating circuit when currents of the same order of magnitude as the welding current flow in said cables.

2. Apparatus according to claim 1, wherein said settable means comprises:
    (a) a counter for counting the pulses delivered by said trigger circuit;
    (b) a decoder connected to the output of said counter and responsive thereto for producing a plurality of different outputs; and
    (c) selection means for selecting one of said plurality of different outputs of said decoder and supplying it to said trigger circuit for stopping the operation thereof.

3. Apparatus according to claim 1, wherein said regulating circuit comprises:
    (a) sensing means adapted to be inductively coupled to one of said cables for sensing said control pulses and providing signal pulses correspoding thereto;
    (b) a counter for counting said signal pulses provided by said sensing means; and
    (c) a decoder responsive to the output of said counter for supplying said control signal to said signal-controlled welding current source.

* * * * *